(12) United States Patent
Chen et al.

(10) Patent No.: US 11,768,130 B2
(45) Date of Patent: Sep. 26, 2023

(54) MICROTOME AND METHOD FOR CONTROLLING AND MANUFACTURING THE SAME

(71) Applicant: The Chinese University of Hong Kong, Hong Kong (CN)

(72) Inventors: Shih-Chi Chen, Hong Kong (CN); Xinlei Fu, Pinghu (CN); Dapeng Zhang, Hong Kong (CN); Jialong Chen, Yiwu (CN)

(73) Assignee: The Chinese University of Hong Kong, Hong Kong (CN)

( * ) Notice: Subject to any disclaimer, the term of this patent is extended or adjusted under 35 U.S.C. 154(b) by 316 days.

(21) Appl. No.: 17/072,504

(22) Filed: Oct. 16, 2020

(65) Prior Publication Data

US 2022/0120641 A1   Apr. 21, 2022

(51) Int. Cl.
*G01N 1/06* (2006.01)

(52) U.S. Cl.
CPC ......... *G01N 1/06* (2013.01); *G01N 2001/061* (2013.01); *G01N 2001/065* (2013.01)

(58) Field of Classification Search
CPC ............... G01N 1/06; G01N 2001/061; G01N 2001/065; G01N 7/16; G01N 2001/068; G01N 2001/066; H04N 7/183; H04N 7/18; G06T 7/0002; G06T 7/0004; G05B 19/401; Y10S 83/9155; Y10T 83/04; Y10T 83/0448; Y10T 83/0475; Y10T 83/0467; Y10T 83/8805; Y10T 83/8843; Y10T 83/8874; Y10T 83/8876
USPC ........ 83/597, 602, 42, 370, 915.5, 743, 368, 83/821, 823, 703, 707; 348/61
See application file for complete search history.

(56) References Cited

U.S. PATENT DOCUMENTS

| | | | | |
|---|---|---|---|---|
| 5,437,215 A | * | 8/1995 | Hamilton | B26D 7/086 83/956 |
| 6,536,121 B1 | * | 3/2003 | Ishikawa | C03B 33/10 83/881 |
| 2013/0152757 A1 | * | 6/2013 | Nakai | B26D 3/085 83/601 |
| 2015/0204761 A1 | * | 7/2015 | Chen | G01N 1/06 83/13 |
| 2019/0176194 A1 | * | 6/2019 | Chen | B01L 9/52 |

FOREIGN PATENT DOCUMENTS

CN   202318389 U   *   7/2012   ............... G01N 1/06

* cited by examiner

*Primary Examiner* — Ghassem Alie
(74) *Attorney, Agent, or Firm* — Schwegman Lundberg & Woessner, P.A.

(57) ABSTRACT

A microtome comprises a support assembly; an actuator, mounted to the support assembly; a pair of oscillating flexure assemblies, held by the support assembly and each of which being located on one side of the actuator and oscillated by the actuator; and a blade assembly, mounted to each of the oscillating flexure assemblies so as to move in a direction same as the oscillating flexure assemblies.

24 Claims, 11 Drawing Sheets

MICROTOME AND METHOD FOR CONTROLLING AND MANUFACTURING THE SAME

TECHNICAL FIELD

The application relates generally to a microtome. More particularly, embodiments of the invention relate to an ultrafast microtome based on vibration cancellation and a method for controlling the ultrafast microtome.

BACKGROUND

Precision tissue sectioning is one of the enabling steps in 3D whole organ imaging due to the immense size of an organ, e.g., brain, and the limited imaging depths of advanced microscopy methods, such as confocal or two-photon excitation (TPE) microscopy. Although the tissue clearing technique has largely eliminated the scattering problems in tissues, the imaging depth is still constrained by the working distance of an objective lens, which is typically on the scale of 10s to 100s of microns for high numerical aperture (NA) objectives. On the other hand, expansion microscopy enables super-resolution imaging via regular fluorescent microscopes by synthesizing a swellable polymer network within a biological specimen for expansion over a factor of 10. Yet, the expanded specimen becomes softened which prevents effective sectioning via conventional microtomes. The development of these new imaging and material processing techniques necessitate the development of a new class of microtome to slice soft tissues, tumors, or organs into thin sections for microscopic imaging, followed by volume reconstruction.

One common approach to enhance the cutting results is to harden the tissues, for example, by embedding the tissues with paraffin wax or freezing the tissues to cryogenic temperature for processing. However, these protocols are not suitable for processing living tissues nor to be combined with tissue clearing or expansion microscopy. To address the issue, i.e., sectioning soft tissues at suitable temperatures (4-20° C.) without chemicals, we propose to harden the (living) tissues by exploiting their intrinsic viscoelastic properties, i.e., tissue stiffness increases with increasing cutting frequency. This calls for an oscillating blade microtome of high operation frequency. When an oscillating blade microtome is in operation, the sample is fed to the blade in a direction, i.e., cutting direction, transverse to the oscillating direction of the blade.

Although oscillating blade microtomes have been around for more than three decades, their performance is still limited by the low operation frequency, i.e., <80 Hz, and the associated parasitic blade motions at higher frequencies (i.e., >60 Hz). According to fracture mechanics, optimal sectioning results can be achieved by minimizing the global deformation in tissues and locally maximizing the stress concentration. This can be achieved by locally stiffening the tissues with a fast oscillating blade. Our analytical study shows that when the blade frequency goes beyond 200 Hz, the sectioning results can be effectively improved. Yet, this goal can only be realized when the parasitic blade motions, i.e., motions transverse to the blade oscillation direction, are suppressed to within 1 micron. A microtome that meets this requirement can address critical issues in many emerging imaging and biological applications, such as super-resolution imaging via expansion microscopy and tissue optical clearing, or the combination of them.

SUMMARY OF INVENTION

In one aspect of the present application, is provided, which comprises: a support assembly; an actuator, mounted to the support assembly; a pair of oscillating flexure assemblies, held by the support assembly and each of which being located on one side of the actuator and oscillated by the actuator; and a blade assembly, mounted to each of the oscillating flexure assemblies so as to move in a direction same as the oscillating flexure assemblies.

In another aspect of the present application, a method for manufacturing a microtome is provided, which comprises: providing a support assembly; mounting an actuator to the support assembly; holding a pair of oscillating flexure assemblies by the support assembly, and locating each of the pair of oscillating flexure assemblies on one side of the actuator, and oscillating the pair of oscillating flexure assemblies using the actuator; and mounting a blade assembly to each of the oscillating flexure assemblies so as to move the blade assembly in a direction same as the oscillating flexure assemblies.

In another aspect of the present application, a method for controlling a microtome is provided, which comprises: mounting a vibration control assembly to a support assembly of a microtome, wherein the microtome comprises an actuator, mounted to the support assembly; a pair of oscillating flexure assemblies, held by the support assembly and each of which being located on one side of the actuator and oscillated by the actuator; and a blade assembly, mounted to each of the oscillating flexure assemblies so as to move in a direction same as the oscillating flexure assemblies; measuring, with a sensor, motions and forces of each of the oscillating flexure assemblies on both sides and generating a signal about the motions and the forces; receiving, with a vibration controller, the signal from the sensor, and estimating a unbalanced dynamic force/torque and determining a desired driving force that the actuator should generate based on a control algorithm in response to the signal; and adjusting, with a power amplifier, the actuator according to the desired driving force.

BRIEF DESCRIPTION OF DRAWINGS

Embodiments of the invention are illustrated by way of example and not limitation in the figures of the accompanying drawings in which like references indicate similar elements.

DETAILED DESCRIPTION OF EMBODIMENTS

Reference will now be made in detail to some specific embodiments of the application including the best modes contemplated by the inventors for carrying out the invention. Examples of these specific embodiments are illustrated in the accompanying drawings. While the application is described in conjunction with these specific embodiments, it will be understood that it is not intended to limit the application to the described embodiments. On the contrary, it is intended to cover alternatives, modifications, and equivalents as may be included within the spirit and scope of the application as defined by the appended claims. In the following description, numerous specific details are set forth in order to provide a thorough understanding of the present application. The present application may be practiced without some of these specific details. In other instances, well-known process operations have not been described in detail in order not to unnecessarily obscure the present application.

Reference in the specification to "an embodiment" or "an embodiment" means that a particular feature, structure, or characteristic described in conjunction with the embodiment can be included in at least an embodiment of the invention. The appearances of the phrase "in an embodiment" in various places in the specification do not necessarily all refer to the same embodiment.

Figure 1:
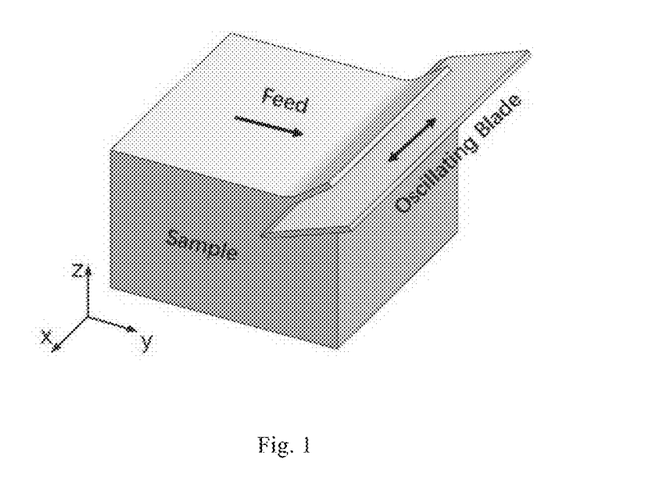
FIG. 1 shows a schematic view of sectioning a soft material via an oscillating blade.

FIG. 1 shows a schematic view of sectioning a soft material via an oscillating blade. As illustrated in FIG. 1, the blade oscillates in the x direction; and the sample is fed to the oscillating blade in the y direction.

When an oscillating blade microtome is in operation, the sample is fed to the blade in a direction, i.e., cutting direction, transverse to the oscillating direction of the blade. The parasitic blade motions, i.e., motions transverse to the blade oscillation direction should be suppressed to within 1 micron to improve the sectioning results by locally stiffening the tissues with a fast oscillating blade.

The design of new oscillating blade microtome is inspired by the fundamental understanding of soft tissue cutting mechanism. Soft tissues have intrinsic viscoelasticity that the tissue stiffness increases with increasing excitation frequency. The viscoelastic property could be utilized to minimize the global deformation by self-stiffening the tissues during high-frequency cutting. As a result, optimal sectioning results can be achieved with a fast oscillating blade. Our analytical and experimental study shows that when the blade frequency goes beyond 200 Hz, the sectioning results (flatness, section thickness etc.) can be effectively improved. In addition, higher blade oscillation frequency can further improve the tissue cutting results. The new microtome therefore targets to have an operating range of 5-500 Hz that none of the existing system can realize.

Figure 2:
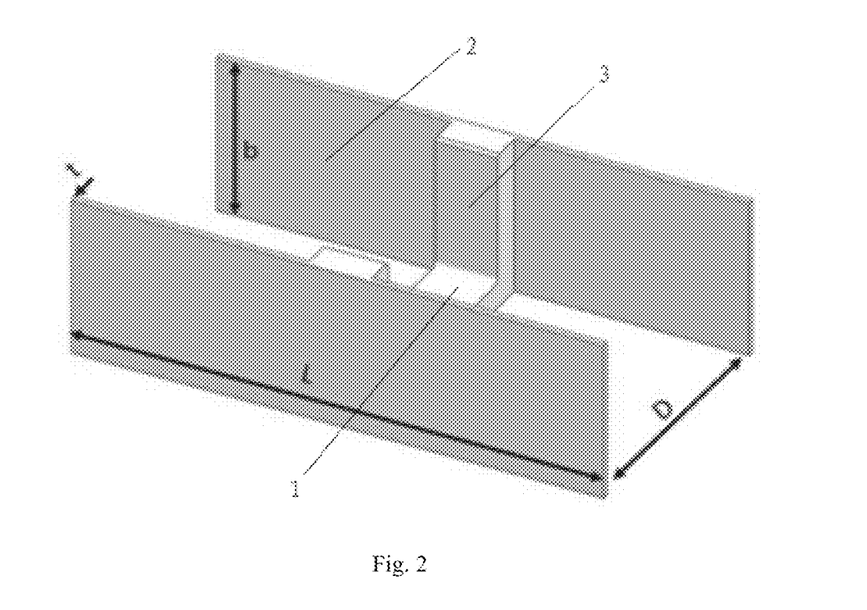
FIG. 2 illustrates a schematic diagram of a flexure beam for oscillation of an oscillating flexure assembly of a microtome according to an embodiment.

FIG. 2 illustrates a schematic diagram of a flexure beam for oscillation of an oscillating flexure assembly of a microtome according to an embodiment. The microtome is designed based on the compliant mechanism, where monolithic flexible beams function as mechanical bearings to generate precise and repeatable motions of an oscillating blade. As illustrated in FIG. 2, the symmetric flexure beams for oscillation with parameters including beam thickness t, width b, length L and spacing distance D. By adjusting the length and aspect ratio of the flexure beams, the in-plane and out-of-plane stiffness and natural frequency of the mechanism can be optimized. The resonance frequency of the oscillating flexure assembly, the driving force of a actuator, and mass of oscillating structure together determine the working frequency of the oscillating blade microtome, which is 5~500 Hz in a embodiment.

When the microtome is in operation, as illustrated in FIG. 1, the sample is fed to the blade in cutting direction, transverse to the oscillating direction of the blade. To achieve high sectioning quality, the blade should be operated at high frequency (>200 Hz) in the cutting plane where parasitic motions perpendicular to the cutting plane interfere with sample surface and lead to deteriorated cutting quality. The investigation on the associated parasitic blade motions at high frequencies can provide guidance on suppressing the unwanted out-of-plane motions, i.e. z-axis motion.

By theoretical and experimental investigation, the unbalanced dynamic force is the main source of parasitic blade motion in z-axis. The clamping ends exert large reaction force to the oscillating flexure assembly; at the same time, the excitation force is also acting on the oscillating flexure assembly. As such, the resultant force is unbalanced, which exerts alternating dynamic force to the oscillating blade and leads to parasitic blade motions. As predicted by the model, the unbalanced dynamic force increases quadratically with the blade oscillation frequency:

$$F(t)=kM\omega^2 Y_a e^{j\omega t}$$

where ω is working frequency, M is mass of oscillating structure and $Y_a e^{j\omega t}$ is oscillation amplitude.

As illustrated in FIG. 2, the oscillating flexure assembly 1 comprise two flexure beams 2 with both ends connected to a support assembly of the microtome and a holder 3 connected to the flexure beams 2 for holding a blade assembly between the flexure beams 2.

Figure 3A:
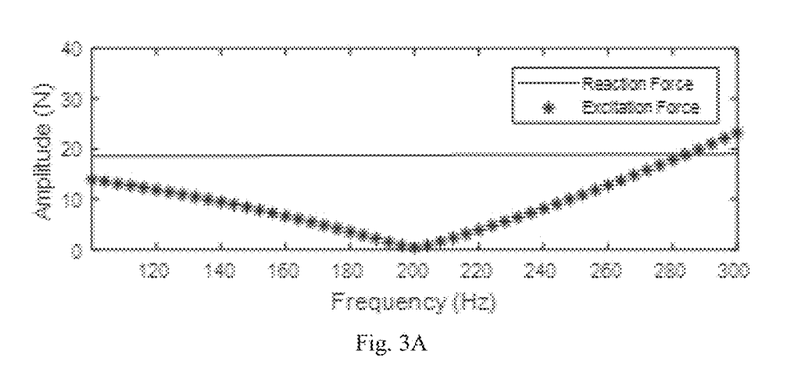
FIGS. 3A and 3B illustrate diagram of an unbalanced resultant force from the reaction force and excitation force.
Figure 3B:
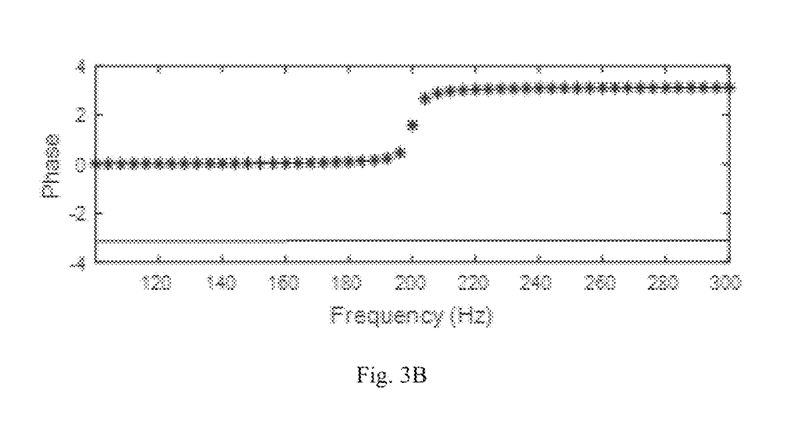

FIGS. 3A and 3B illustrate diagram of an unbalanced resultant force from the reaction force and excitation force, i.e. combination of the reaction force and excitation force. Due to the size and intrinsic mass of the microtome as well as the fact that the excitation source, e.g. unbalanced dynamic forces, in flexures increases quadratically with frequency, it is extremely challenging to design a mechanism that can operate smoothly beyond 200 Hz. These findings lead to the concept of vibration cancellation and active vibration control which could suppress parasitic blade motions in the undesired directions at high oscillation frequencies.

According to an embodiment of the present application, a microtome 4 may comprises a support assembly 5; an actuator 6, such as a pair of linear actuators, mounted to the support assembly 5; a pair of oscillating flexure assemblies 1, held by the support assembly 5 and each of which being located on one side of the actuator 6 and oscillated by the actuator 6; and a blade assembly 8, mounted to each of the oscillating flexure assemblies so as to move in a direction same as the oscillating flexure assemblies. Details of the microtome 4 will be discussed below with reference to FIGS. 4A to 4D.

FIGS. 4A to 4D show a perspective view, a top view, a side view and a front view of a microtome 4 according to the embodiment, respectively. The support assembly 5 comprises a base 9 and a frame 11 for mounting the actuator 6 and the pair of oscillating flexure assemblies. The blade assembly 8 comprises a blade 12 and a blade holder 13 holding the blade 12.

As illustrated in FIGS. 4A to 4D, a double symmetry configuration, i.e., symmetry about the x and y axes, is adopted for the microtome 4.

The symmetric design means two synchronized microtome 4 need to operate in parallel, where the blades 12 oscillate in opposite directions. This arrangement of blade motion symmetry cancels out vibrations during high speed operations and doubles the throughput of tissue sectioning. The blade holder 13 is supported by two sets of parallel flexure beams 2 to confine the blade motion in the x-axis. By adjusting the length and aspect ratio of the beams 2, the in-plane and out-of-plane stiffness of the mechanism can be optimized. The blade motion is generated by the actuator 6, such as two opposing voice-coil motors (VCMs), which are selected based on their high force density and precision. One way to increase the resonance frequency is to remove the redundant mass on the mechanism and to use materials of high stiffness and low density. In this embodiment, considering cost and flexing capability, the monolithic mechanism is made from a 1" thick aluminum 7075 plate. To ensure the actuator 6 can generate sufficient oscillation amplitudes in the target operation frequency (i.e., 5-500 Hz), the resonance frequency of the mechanism is designed to 200 Hz. Based on this constraint, the supporting flexure beams 2 are designed to be 1 mm thick, 85 mm long and distanced by 45 mm.

Figure 4A:
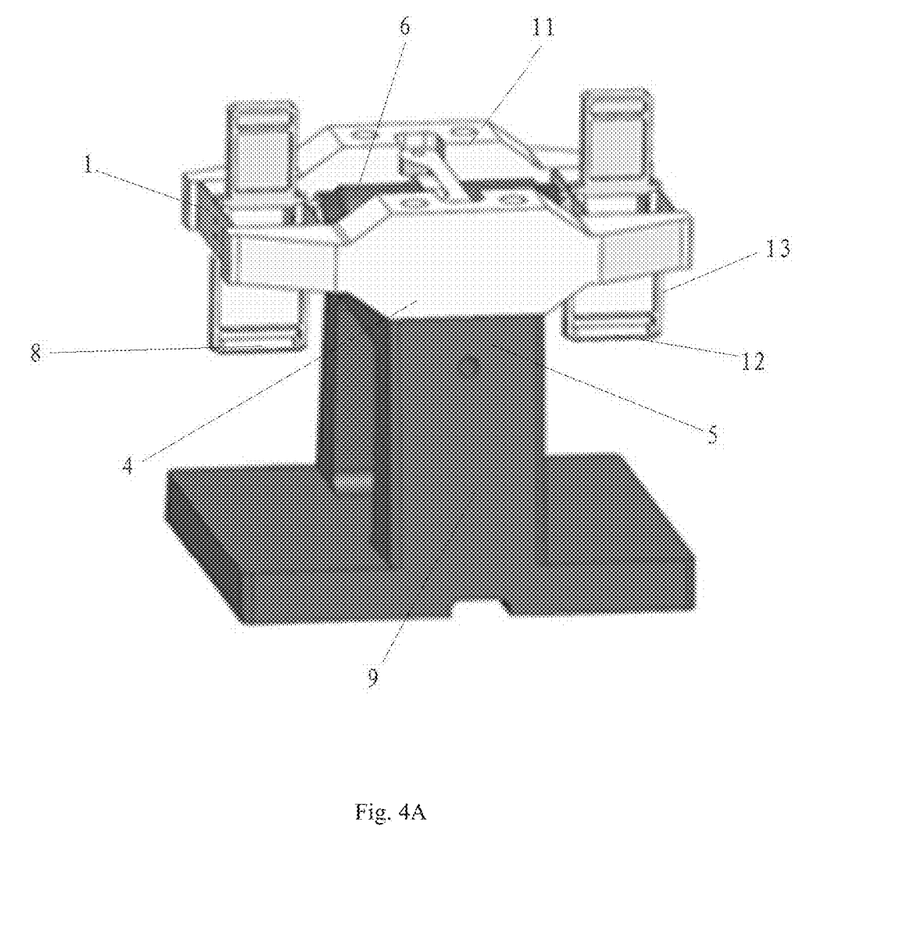
FIGS. 4A to 4D show a perspective view, a top view, a side view and a front view of a microtome according to an embodiment.
Figure 4B:
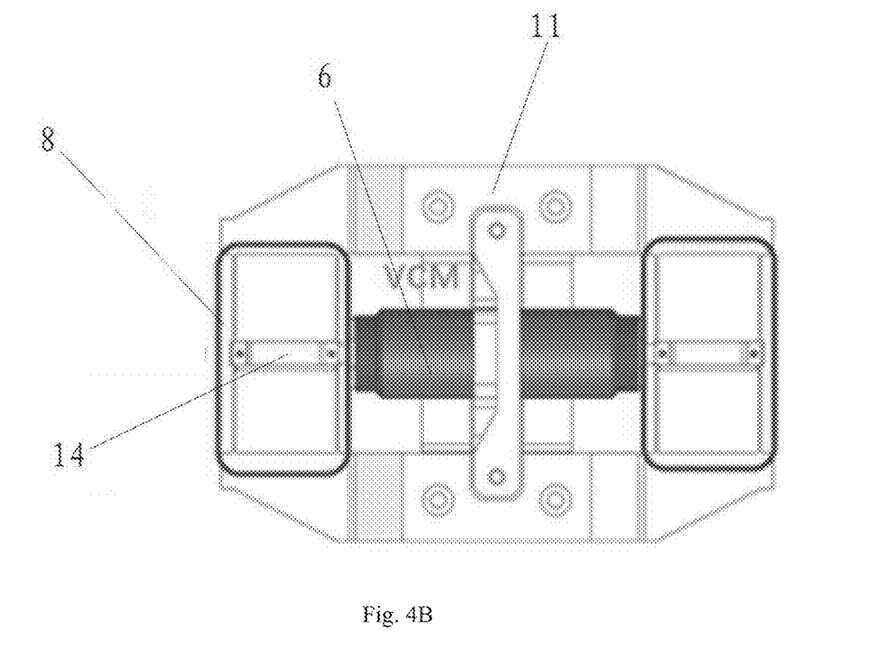
Figure 4C:
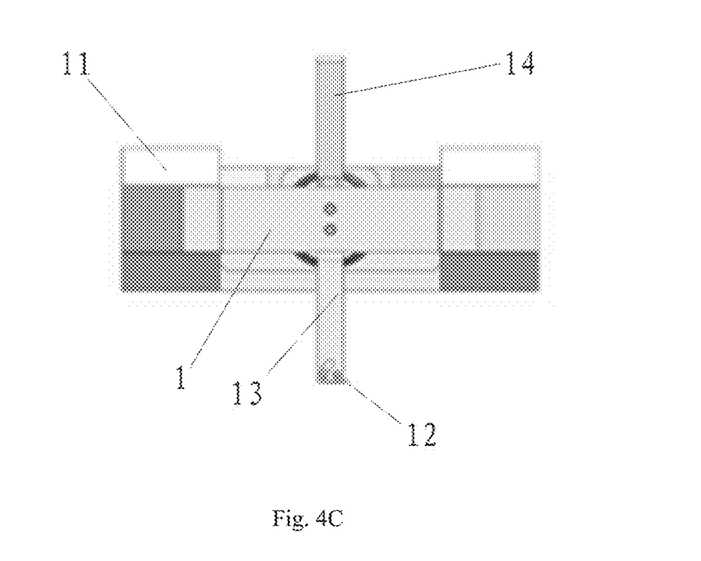
Figure 4D:
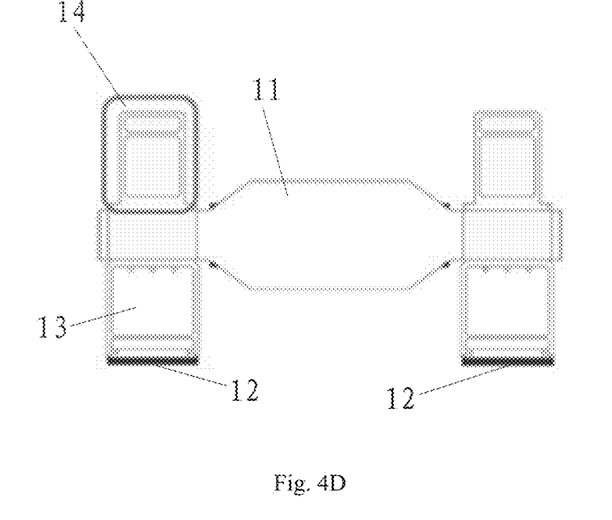

A shown in FIGS. 4B and 4C, the blade holders 13 extend 50 mm downward from the mechanism to position the moving blades 12 close to the sample, which is immersed in the water tank. This unavoidably lowers the mechanism's center of mass, exerting torques to the blade holders 13 and causing them to wobble about the y-axis. To address this issue, the blade assembly 8 further comprises a dummy structure 14 on a side of the blade assembly 8 opposite to the blade 12 and the blade holder 13. The dummy structure 14 adjusts a natural frequency of the oscillating flexure assembly 1 and the blade assembly 8 as well as a center of mass of the oscillating flexure assembly 1.

In this embodiment, the dummy structures 14 are added to the top of the blade holders 13 to bring the center of mass to the mechanism plane, where the forces of the VCMs are applied to. This arrangement eliminates the unwanted torques generated in dynamic operations.

As shown in FIG. 4A, the ultrafast microtome 4 is installed on a custom-made cast iron base 9 to absorb disturbance forces. In one embodiment, the parasitic motions can be controlled within 1 μm with an oscillation amplitude of 200 μm at 350 Hz.

Figure 5A:
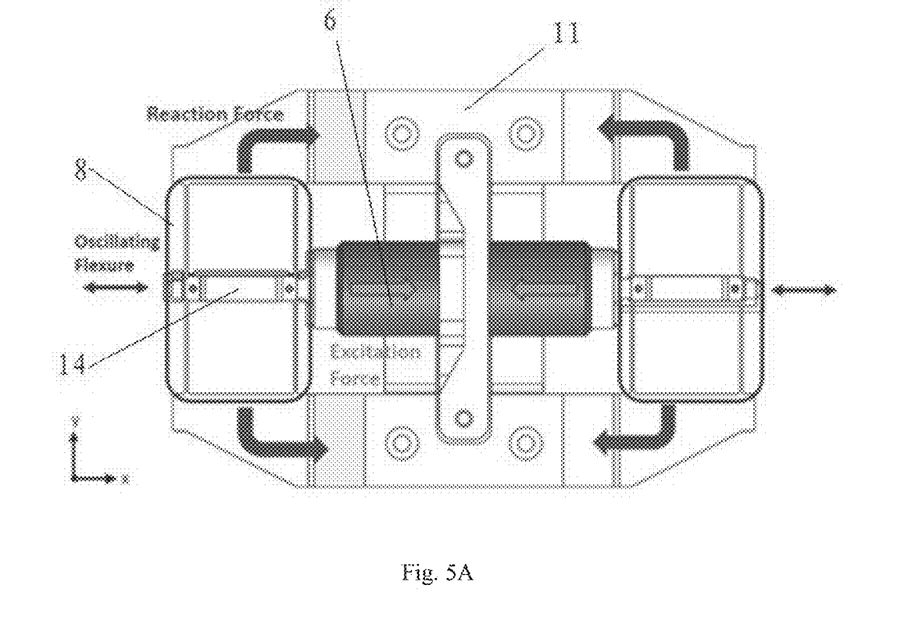
FIGS. 5A to 5B illustrate dynamic force cancellation and dynamic torque cancellation by symmetry in a schematic top view and a side view of a microtome according to an embodiment.
Figure 5B:
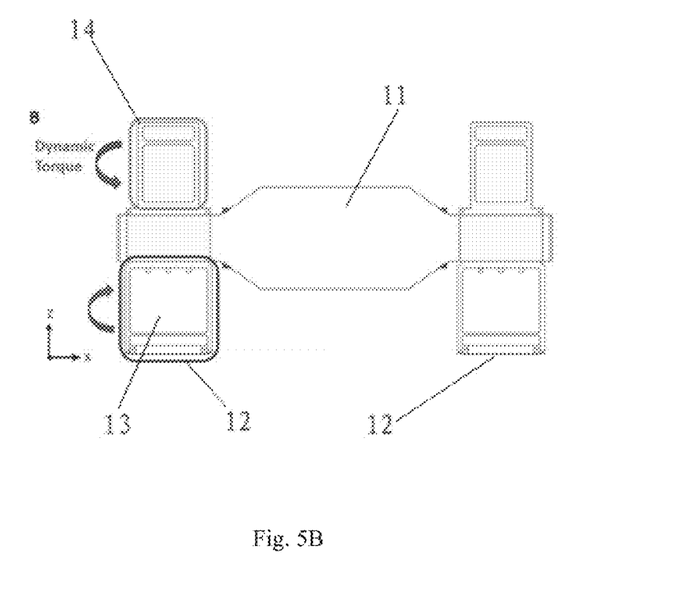

FIGS. 5A to 5B illustrate dynamic force cancellation and dynamic torque cancellation by symmetry in a schematic top view and a side view of a microtome 4 according to an embodiment.

The concept of vibration cancellation is to cancel out the excitation source of the parasitic motions by adopting a multi-symmetry design. FIG. 5A shows the symmetric design that two synchronized flexure units operate in parallel and oscillate in opposite directions. The reaction forces generated from the reciprocating motions of the flexure units can thus be cancelled out. The two linear actuators (VCMs in this embodiment) with a symmetric arrangement simultaneously drive the flexures so that the excitation forces, as well as external disturbance forces can be cancelled out.

The concept of vibration cancellation is also exploited in the x-z plane, as shown in FIG. 5B. The oscillating blade holders 13 unavoidably exert dynamic torques to the oscillating flexure assemblies 1 and causes parasitic blade motion in z-axis. To address this issue, dummy structures 14 are added to the top of the blade holders 13 which generate the same dynamic torque with opposite direction. This arrangement cancels the unwanted torques generated in dynamic operations and eliminates parasitic blade motions.

Figure 6:
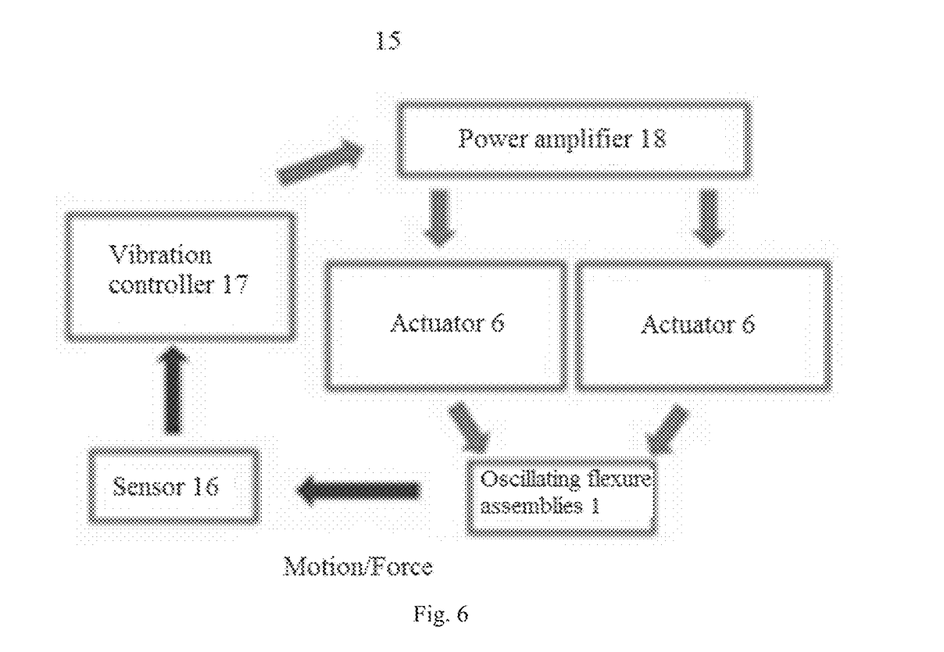
FIG. 6 shows a block diagram of active vibration control for a microtome according to an embodiment.
Figure 7:
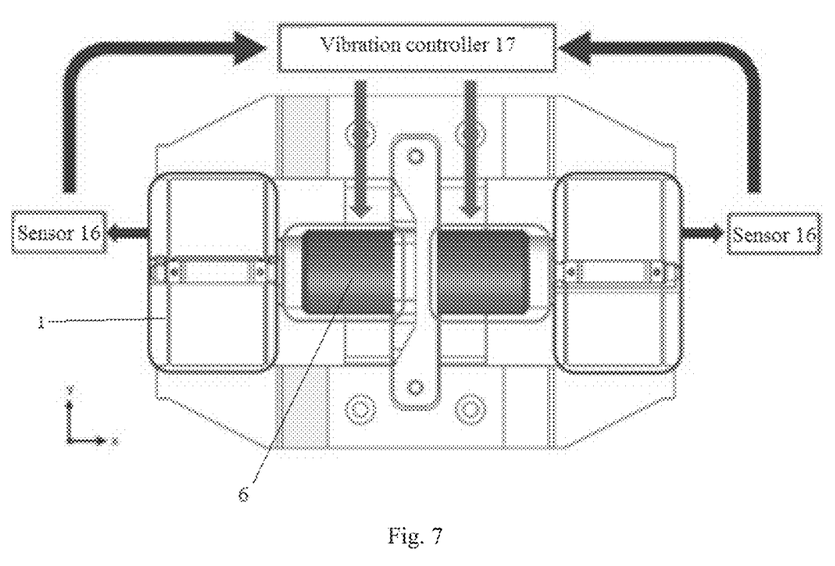
FIG. 7 shows a schematic diagram of implementing active vibration control for a microtome according to an embodiment.

Although the concept of passive vibration cancellation effectively enables the high-frequency operation of the ultrafast microtome 4 with minimal parasitic blade motion, the assembly errors (e.g., alignment of VCMs) and fabrication errors (e.g., dimensions of the beams, mass of the dummy structures 14 and blade holders 13) can compromise the symmetry of dynamic forces and dynamic torques, leading to compromised vibration cancellation performance. To address the issue, active vibration control can be applied. The concept of active vibration control is to actively generate the dynamic force and torque for cancellation based on the sensing of flexure motion and unbalanced force. As illustrated in FIGS. 6-7, in order to implement the active vibration control, in an embodiment, the microtome 4 further comprises a vibration control assembly 15 mounted to the support assembly 5 for adjusting the actuator 6. The vibration control assembly 15 comprises: a sensor 16, measuring motions and forces of each of the Oscillating flexure assemblies 1 on both sides and generating a signal about the motions and the forces; a vibration controller 17, receiving the signal from the sensor 16, and estimating a unbalanced dynamic force/torque and determining a desired driving force that the actuator 6 should generate based on a control algorithm in response to the signal; and a power amplifier 18, adjusting the actuator 6 according to the desired driving force.

As illustrated in FIG. 6, the installed sensors 16 (e.g., strain gauges or laser interferometers) measure the motions and forces of the oscillating flexures on both sides and feed the signals to the vibration controller 17. The vibration controller 17 estimates the unbalanced dynamic force/torque and determine the desired driving forces that the linear actuators should generate based on the control algorithm. Lastly, the control signal is fed into power amplifier to adjust the amplitude and phase of generated excitation forces in linear actuators. As a result, the dynamic forces and torques can be cancelled out regardless of the assembly and fabrication factors, and the parasitic blade motions can be further minimized.

Except for the flexure, other components in the microtome 4 are designed to have high stiffness. The mounting base 9 provides weight and is stiff and rigidly mounted to the table. The blade holder 13 is configured to hold the blade 12 horizontally and allows fine adjustments of the cutting angle.

In an embodiment, the ultrafast microtome 4 has demonstrated error motion suppression capability with a wide frequency tuning range (i.e., 5-500 Hz) and an oscillation amplitude of ~200 µm, achieving the design goals. The sample sectioning diameter is up to 80 mm.

Table 1 summarizes the performance of the ultrafast microtome 4.

TABLE 1

Specifications for the flexure-based microtome

| | |
|---|---|
| Feed rate | 0-10 mm/s |
| Vibration frequency | 5-500 Hz |
| Vibration amplitude | 0-0.2 mm |
| Section thickness | 10-500 µm |
| Section diameter | <80 mm |
| Parasitic z-motion | <1 µm |

Figure 8:
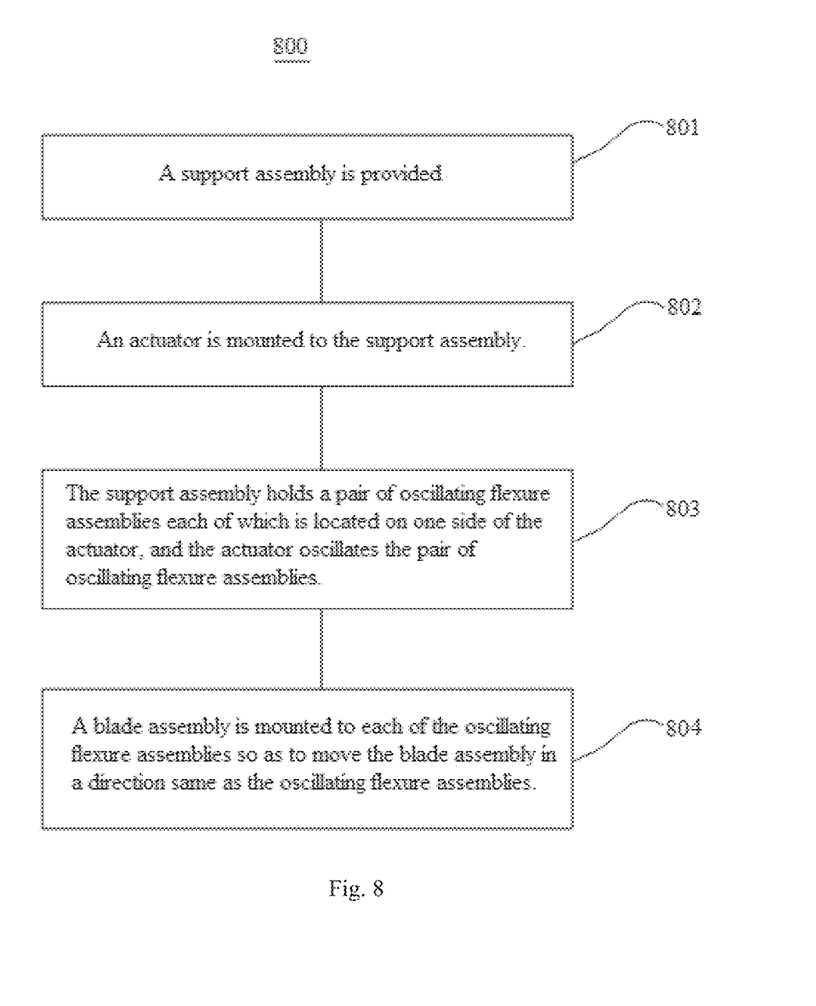
FIG. 8 shows a flow chart of a method for manufacturing a microtome according to an embodiment.

According to an embodiment of the present application, a method 800 for manufacturing the microtome 4 as described above is also provided. A flowchart of the method is shown in FIG. 8. As shown in FIG. 8, the method 800 for manufacturing the microtome 4 according to the present application includes the following steps. At step 801, a support assembly 5 is provided. At step 802, an actuator 6 is mounted to the support assembly 5. At step 803, the support assembly 5 holds a pair of oscillating flexure assemblies 1 each of which is located on one side of the actuator 6, and the actuator 6 oscillates the pair of oscillating flexure assemblies 1. At step 804, a blade assembly 8 is mounted to each of the oscillating flexure assemblies 1 so as to move the blade assembly 8 in a direction same as the oscillating flexure assemblies 1.

According to another embodiment of the present application, a method 900 for controlling the microtome 4 as described above is also provided. A flowchart of the method is shown in FIG. 9.

Figure 9:
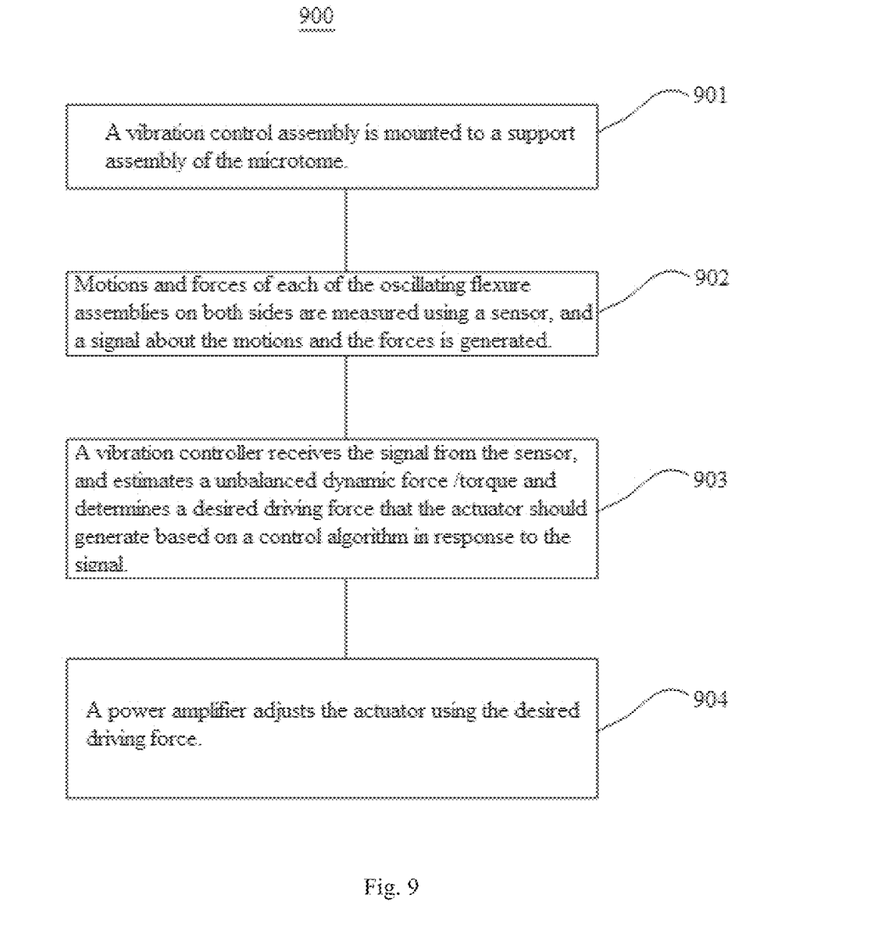
FIG. 9 shows a flow chart of a method for controlling a microtome according to an embodiment.

As illustrated in FIG. 9, the method 900 for controlling the microtome 4 according to the present application includes the following steps. At step 901, a vibration control assembly 15 is mounted to a support assembly 5 of the microtome 4. At step 902, motions and forces of each of the oscillating flexure assemblies 1 on both sides are measured using a sensor 16, and a signal about the motions and the forces is generated. At step 903, a vibration controller 17 receives the signal from the sensor 16, and estimates an unbalanced dynamic force/torque and determines a desired driving force that the actuator 6 should generate based on a control algorithm in response to the signal. At step 904, a power amplifier adjusts the actuator 6 according to the desired driving force.

Figure 10A:
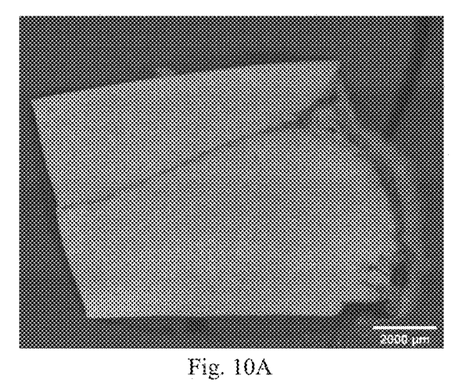
FIG. 10A shows a view of average intensity projection of the volume OCT of dorsolateral prefrontal cortex of a human brain sectioned by a microtome according to an embodiment.
Figure 10B:
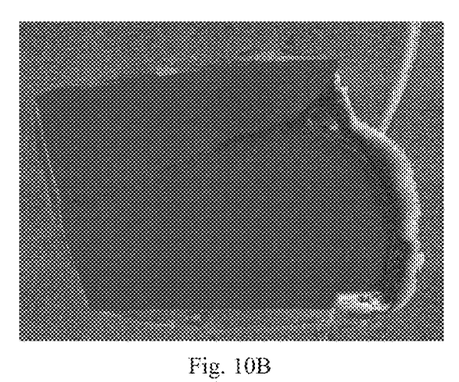
FIG. 10B shows a view of average intensity projection of the volume OCT of dorsolateral prefrontal cortex of a human brain sectioned by a microtome according to an embodiment.
Figure 11:
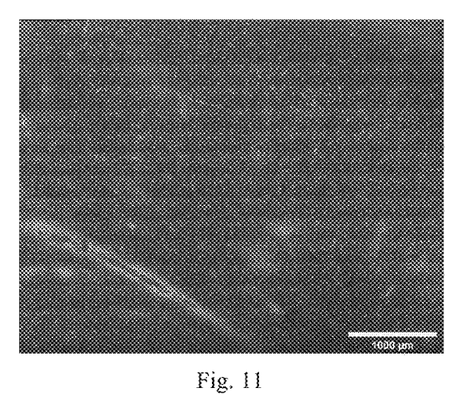
FIG. 11 shows an autofluorescence image of a stitched human brain slice using a commercial TPE microscope.
Figure 12:
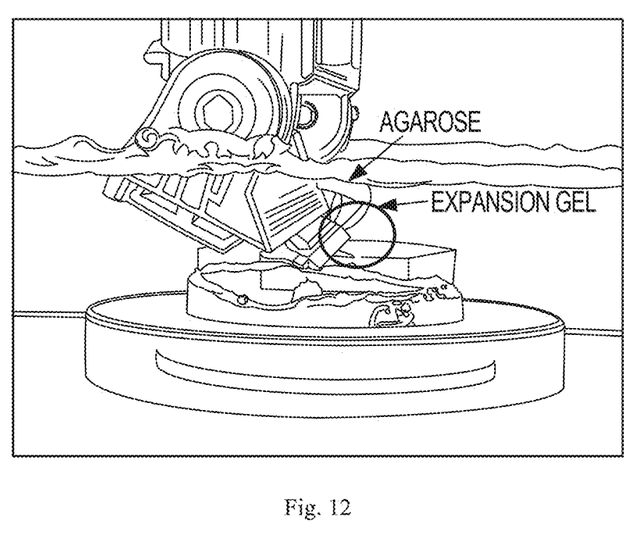
FIG. 12 shows a view of sectioning a block of expanded hydrogel embedded in agarose (12×12×12 mm$^3$) for expansion microscopy applications by a microtome according to an embodiment.

FIG. 11 shows an autofluorescence image of a stitched human brain slice using a commercial TPE microscope. FIG. 10A shows a view of average intensity projection of the volume OCT of dorsolateral prefrontal cortex of a human brain sectioned by a microtome 4 according to an embodiment. FIG. 10B shows a view of average intensity projection of the volume OCT of dorsolateral prefrontal cortex of a human brain sectioned by a microtome 4 according to an embodiment. FIG. 12 shows a view of sectioning a block of expanded hydrogel embedded in agarose (12×12×12 mm$^3$) for expansion microscopy applications by a microtome 4 according to an embodiment.

As can be seen from FIG. 11, conventional oscillating blade microtomes fail to section soft tissues and organs with high precision due to the low operation frequency and the associated parasitic blade motions. These commercially available microtomes have sectioning diameters below 50 mm. A microtome that is capable of operating beyond 200 Hz while the parasitic blade motion suppressed to within 1 micron has not been reported. The cutting blade 12 should have length greater than 50 mm to section large brain samples while still maintaining high precision.

As illustrated in FIGS. 10A, 10B and 12, a precision sectioning of expanded hydrogels, i.e., materials for expansion microscopy is demonstrated. Before sectioning, the hydrogel is expanded 10 times and embedded in 1% agarose. The microtome 4 is equipped with a 60 mm sapphire blade; and the sectioning is performed at 250 Hz with an oscillation amplitude of 175 µm. The gel block is fed to the microtome 4 at 0.2 mm/s. The sectioning results are presented in FIGS. 10A, 10B, where one may find a thin section of gel is removed, leaving a high-quality flat surface for follow-up imaging sequence. This confirms the ultrafast microtome 4 can be used for processing ultra-soft tissues.

Although some embodiments of the present application have been described, those skilled in the art can make variations or modifications to these embodiments upon knowing the basic inventive concept. Although details of the embodiments are described, it is understood that it is not necessary to include all elements in the described embodiments. Instead, some elements in the embodiments could be omitted or altered, without departing from the invention. The appended claims are intended to be considered as comprising the described embodiments and all the variations or modifications fell into the scope of the present application.

What is claimed is:

1. A method for manufacturing a microtome, comprising:
providing a support assembly;
mounting an actuator to the support assembly;
holding a pair of oscillating flexure assemblies by the support assembly, and locating each of the pair of oscillating flexure assemblies on one side of the actuator, and oscillating the pair of oscillating flexure assemblies using the actuator; and
mounting a blade assembly to each of the oscillating flexure assemblies so as to move the blade assembly in a direction same as the oscillating flexure assemblies;
wherein the method further comprises mounting a vibration control assembly to the support assembly for adjusting the actuator;
wherein the vibration control assembly comprises:
a sensor, measuring motions and forces of each of the oscillating flexure assemblies on both sides and generating a signal about the motions and the forces;
a vibration controller, receiving the signal from the sensor, and estimating an unbalanced dynamic force/torque and determining a desired driving force that the actuator should generate based on a control algorithm in response to the signal; and
a power amplifier, adjusting the actuator according to the desired driving force.

2. The method according to claim 1, wherein the support assembly comprises a base and a frame for mounting the actuator and the pair of oscillating flexure assemblies.

3. The method according to claim 2, wherein the base is a custom-made cast iron.

4. The method according to one of claims 1-2, wherein the oscillating flexure assembly comprise two flexure beams with both ends connected to the support assembly and a holder connected to the flexure beams for holding the blade assembly between the flexure beams.

5. The method according to one of claims 1-2, wherein the actuator comprises a pair of linear actuators.

6. The method according to one of claims 1-2, wherein the blade assembly comprises a blade and a blade holder holding the blade.

7. The method according to claim 6, wherein the blade assembly further comprises a dummy structure on a side of the blade assembly opposite to the blade and the blade holder.

8. The method according to one of claims 1-2, wherein the blade assemblies are arranged symmetrically in relative to the support assembly.

9. The method according to claim 7, wherein the dummy structure adjusts a natural frequency of the oscillating flexure assembly and the blade assembly as well as a center of mass of the oscillating flexure assembly.

10. A method for controlling a microtome, comprising:
mounting a vibration control assembly to a support assembly of a microtome, wherein the microtome comprises:
an actuator, mounted to the support assembly;
a pair of oscillating flexure assemblies, held by the support assembly and each of which being located on one side of the actuator and oscillated by the actuator; and
a blade assembly, mounted to each of the oscillating flexure assemblies so as to move in a direction same as the oscillating flexure assemblies,
measuring, with a sensor, motions and forces of each of the oscillating flexure assemblies on both sides and generating a signal about the motions and the forces;
receiving, with a vibration controller, the signal from the sensor, and estimating an unbalanced dynamic force/torque and determining a desired driving force that the actuator should generate based on a control algorithm in response to the signal; and
adjusting, with a. power amplifier, the actuator according to the desired driving force.

11. The method according to claim 10, wherein the sensor comprises a strain gauge and a laser interferometer.

12. The method according to claim 10, wherein the power amplifier adjusts the amplitude and phase of generated excitation forces in the actuator.

13. The method according to one of claims 10-12, wherein the control algorithm is to make the motions in the two oscillating flexure assemblies on both sides have the same amplitude and phase, or have specific different in either amplitude or phase or both, and to make the unbalanced dynamic force/torque minimized.

14. A microtome, comprising:
a support assembly;
an actuator, mounted to the support assembly;
a pair of oscillating flexure assemblies, held by the support assembly and each of which being located on one side of the actuator and oscillated by the actuator; and
a blade assembly, mounted to each of the oscillating flexure assemblies so as to move in a direction same as the oscillating flexure assemblies:
wherein the microtome further comprises a vibration control assembly mounted to the support assembly for adjusting the actuator; and
wherein the vibration control assembly comprises:
a sensor, measuring motions and forces of each of the oscillating flexure assemblies on both sides and generating a signal about the motions and the forces;
a vibration controller, receiving the signal from the sensor, and estimating an unbalanced dynamic force/torque and determining a desired driving force that the actuator should generate based on a control algorithm in response to the signal; and
a power amplifier, adjusting the actuator according to the desired driving force.

15. The microtome according to claim 14, wherein the support assembly comprises a base and a frame for mounting the actuator and the pair of oscillating flexure assemblies.

16. The microtome according to claim 15, wherein the base is a custom-made cast iron.

17. The microtome according to one of claims 14-15, wherein the oscillating flexure assembly comprise two flexure beams with both ends connected to the support assembly and a holder connected to the flexure beams for holding the blade assembly between the flexure beams.

18. The microtome according to one of claims 14-15, wherein the actuator comprises a pair of symmetric linear actuators.

19. The microtome according to one of claims 14-15, wherein the blade assembly comprises a blade and a blade holder holding the blade.

20. The microtorne according to claim 19, wherein the blade assembly further comprises a dummy structure on a side of the blade assembly opposite to the blade and the blade holder.

21. The microtome according to claim 20, wherein the dummy structure adjusts a natural frequency of the oscillating flexure assembly and the blade assembly as well as a center of mass of the oscillating flexure assembly.

22. The microtome according to claim 14, wherein the sensor comprises a strain gauge and a laser interferometer.

23. The microtome according to claim 14, wherein the power amplifier adjusts the amplitude and phase of generated excitation forces in the actuator.

24. The microtome according to one of claims 14-15, wherein the blade assemblies are arranged symmetrically in relative to the support assembly.

* * * * *